Sept. 29, 1953   E. E. HOSKINS   2,653,477
LIQUID LEVEL GAUGE
Filed Dec. 29, 1949   4 Sheets-Sheet 1
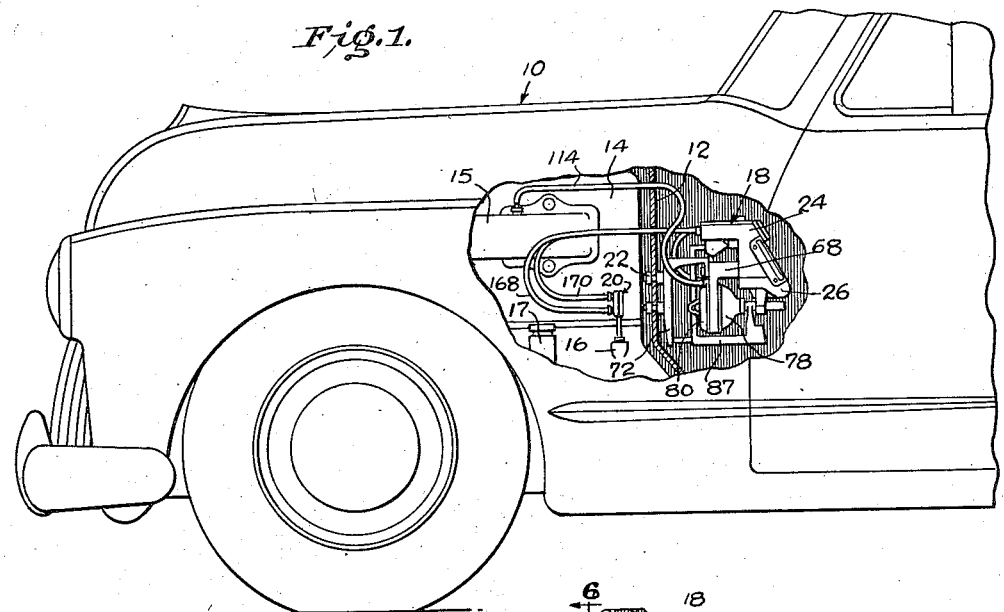
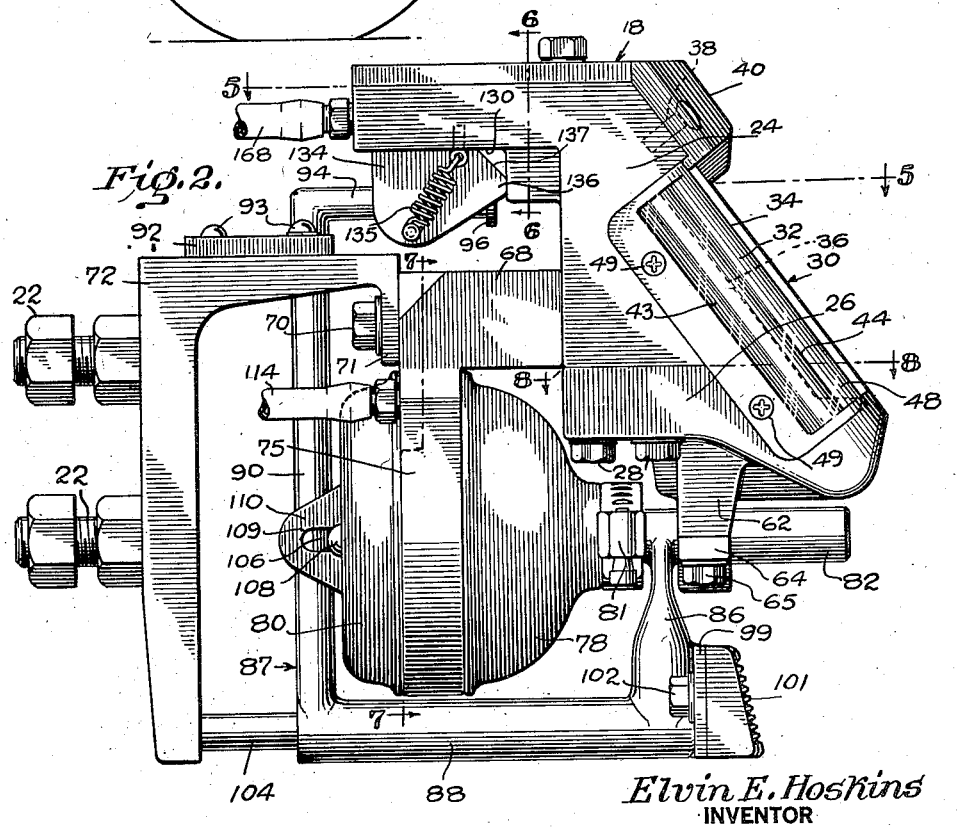
Elvin E. Hoskins
INVENTOR
BY Reginald W. Hoagland
ATTORNEY

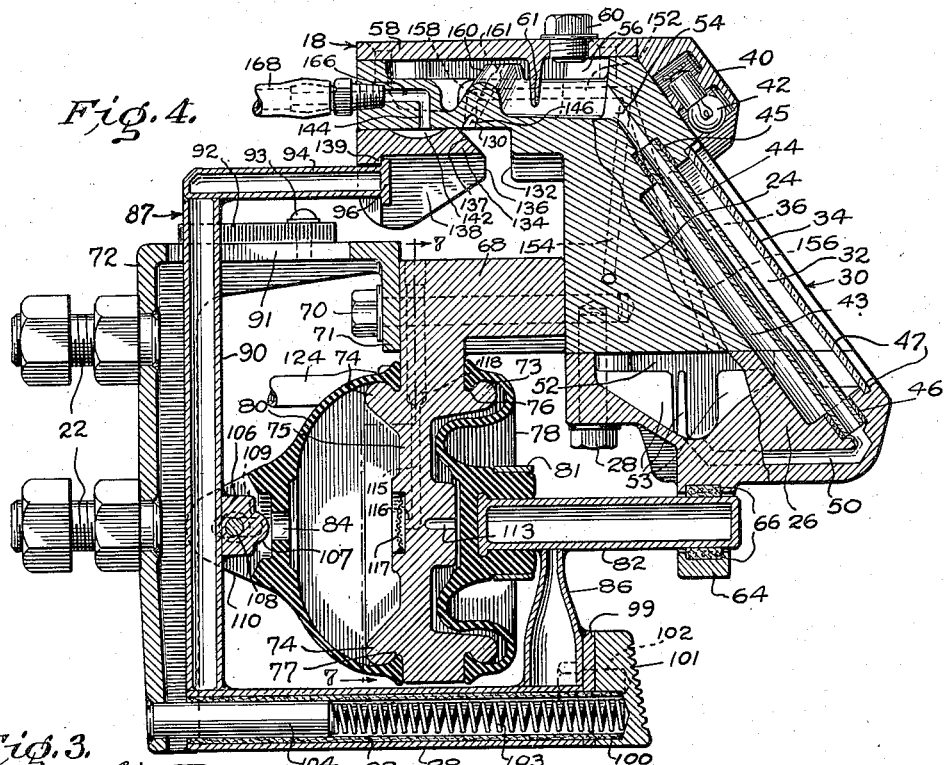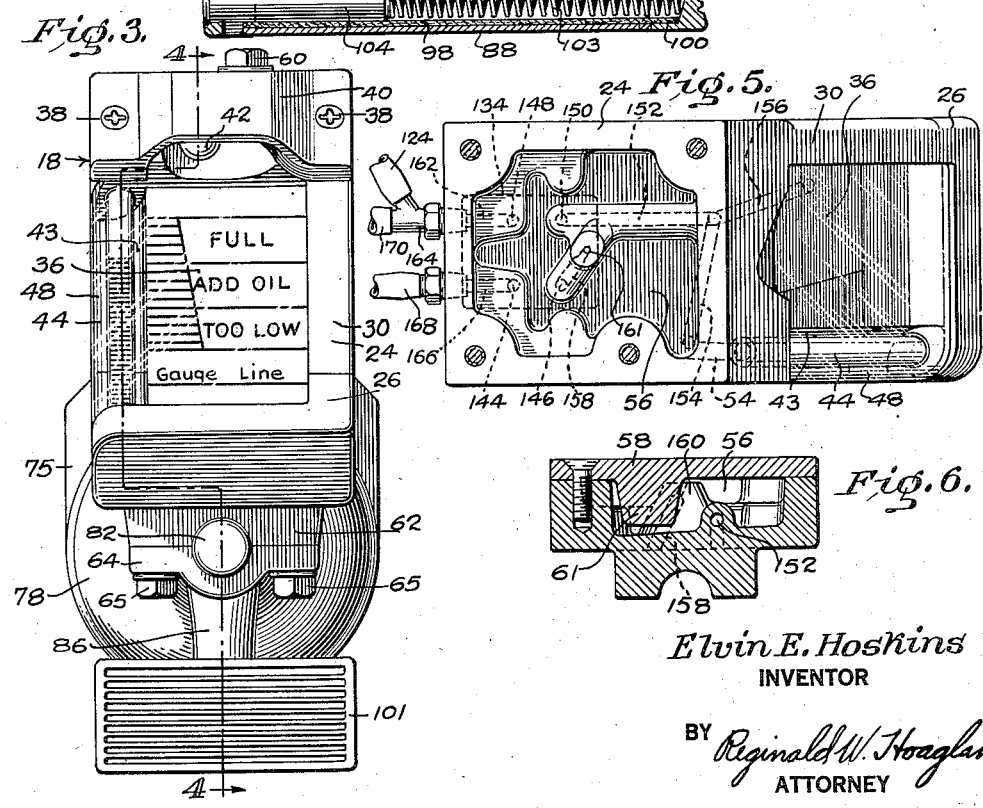

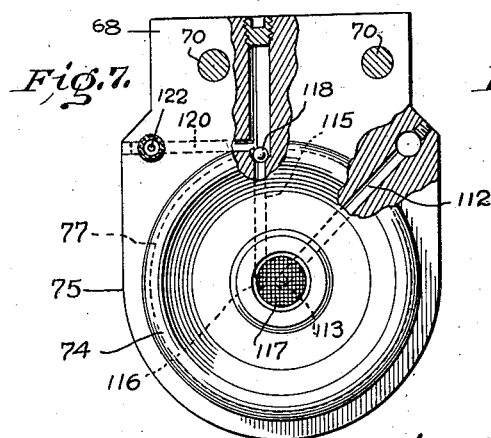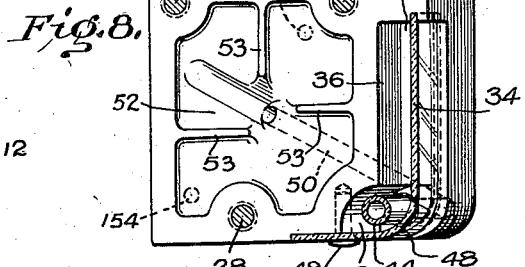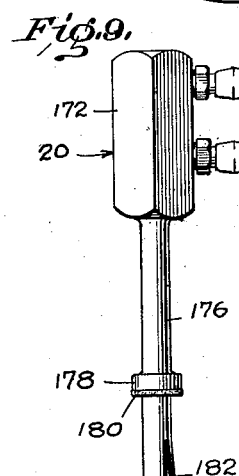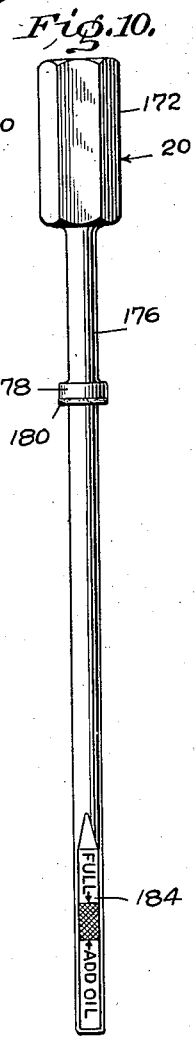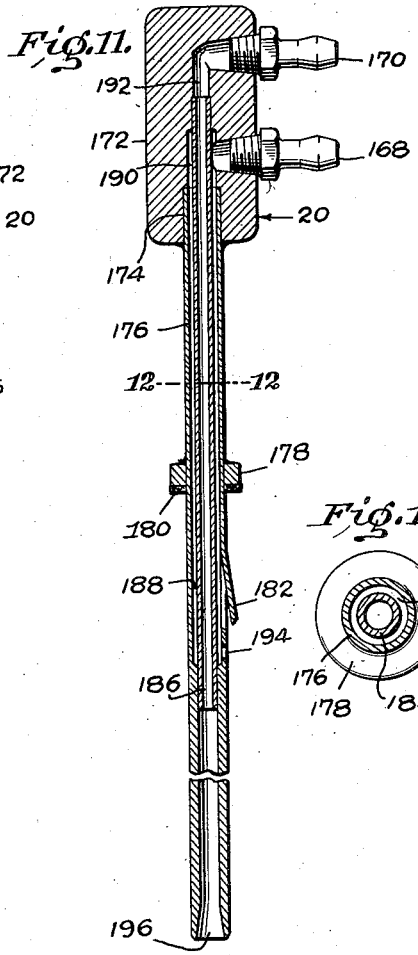
Elvin E. Hoskins
INVENTOR
BY Reginald W. Hoagland
ATTORNEY Sept. 29, 1953 E. E. HOSKINS 2,653,477
LIQUID LEVEL GAUGE
Filed Dec. 29, 1949 4 Sheets-Sheet 4

Elvin E. Hoskins
INVENTOR
BY Reginald W. Hoagland
ATTORNEY

Patented Sept. 29, 1953

2,653,477

UNITED STATES PATENT OFFICE 2,653,477

LIQUID LEVEL GAUGE

Elvin E. Hoskins, Flint, Mich.

Application December 29, 1949, Serial No. 135,610

4 Claims. (Cl. 73—302)

1

This invention comprises novel and useful improvements in liquid level gages and more specifically pertains to an instrument for accurately indicating the depths of liquids in containers or receptacles by means of the hydrostatic head of the liquid level, as, for example, the level of the lubricant in the crankcase of an automobile engine.

The primary object of this invention is to provide an improved gage for automatically and accurately indicating by a hydrostatic head, the level of liquids such as that of oil in the crankcase of an automobile engine, for a period of time upon the stopping of the engine; and for also accurately indicating said level by a manual operation of the gaging device after the engine has been stopped for a prolonged period of time.

A further object of the invention is to provide a liquid level gage in accordance with the preceding object which may be readily applied to an automotive vehicle with a minimum of effort and labor and with a minimum alteration of parts.

A further object of the invention is to provide a liquid level gage in conformity with the above-mentioned objects, wherein the actuating means for effecting the gage reading in accordance with the hydrostatic head of the liquid level is automatically conditioned for an accurate reading upon each operation of the gage.

A still further object of the invention is to provide an improved gage as set forth in the preceding objects wherein the conventional gaging stick for the crankcase of an automobile engine may be replaced with a novel gage stick forming a part of the improved gage and removably retained in the gage stick opening of the crankcase of the automobile engine.

It is also an object of the invention to provide a novel and improved air compressing system for supplying pressure on two bodies of liquids to indicate the level of one by the visible height of the other, which is simple and substantial in construction, which can be manufactured economically, and which will be thoroughly efficient and practical in use.

These, together with various auxiliary features and objects of the invention which will later become apparent as the following description proceeds, are attained by the present invention, a preferred embodiment of which has been illustrated, by way of example only, in the accompanying drawings, wherein:

Figure 1 is a fragmentary side elevational view, parts being broken away, of the front portion of an automotive vehicle illustrating the manner in which the gage of the present invention is applied thereto;

Figure 2 is an enlarged side elevational view of the main body of the improved gage;

Figure 3 is a front elevational view of the main body of the gage, looking at the gage face;

Figure 4 is a vertical longitudinal sectional view taken substantially upon the plane indicated by the section line 4—4 of Figure 3 with the movable parts of the main body of the gage shown in positions opposite from that shown in Figure 2;

Figure 5 is a horizontal sectional view through the upper portion of the body of the gage, taken substantially upon the plane of the section line 5—5 of Figure 2;

Figure 6 is a vertical transverse sectional view taken substantially upon the plane of the section line 6—6 of Figure 2;

Figure 7 is a further vertical transverse sectional view taken substantially upon the plane of the section line 7—7 of Figure 2;

Figure 8 is a further horizontal sectional view taken substantially upon the plane indicated by the section line 8—8 of Figure 2;

Figure 9 is an elevational view of a replacement oil gage stick forming a part of the invention;

Figure 10 is an elevational view taken at right angles to the replacement gage stick of Figure 9;

Figure 11 is a vertical central sectional view through the gage stick of Figures 9 and 10, parts being broken away;

Figure 12 is a horizontal sectional detail view through the replacement stick, taken substantially upon the plane of the section line 12—12 of Figure 11.

Figure 13:
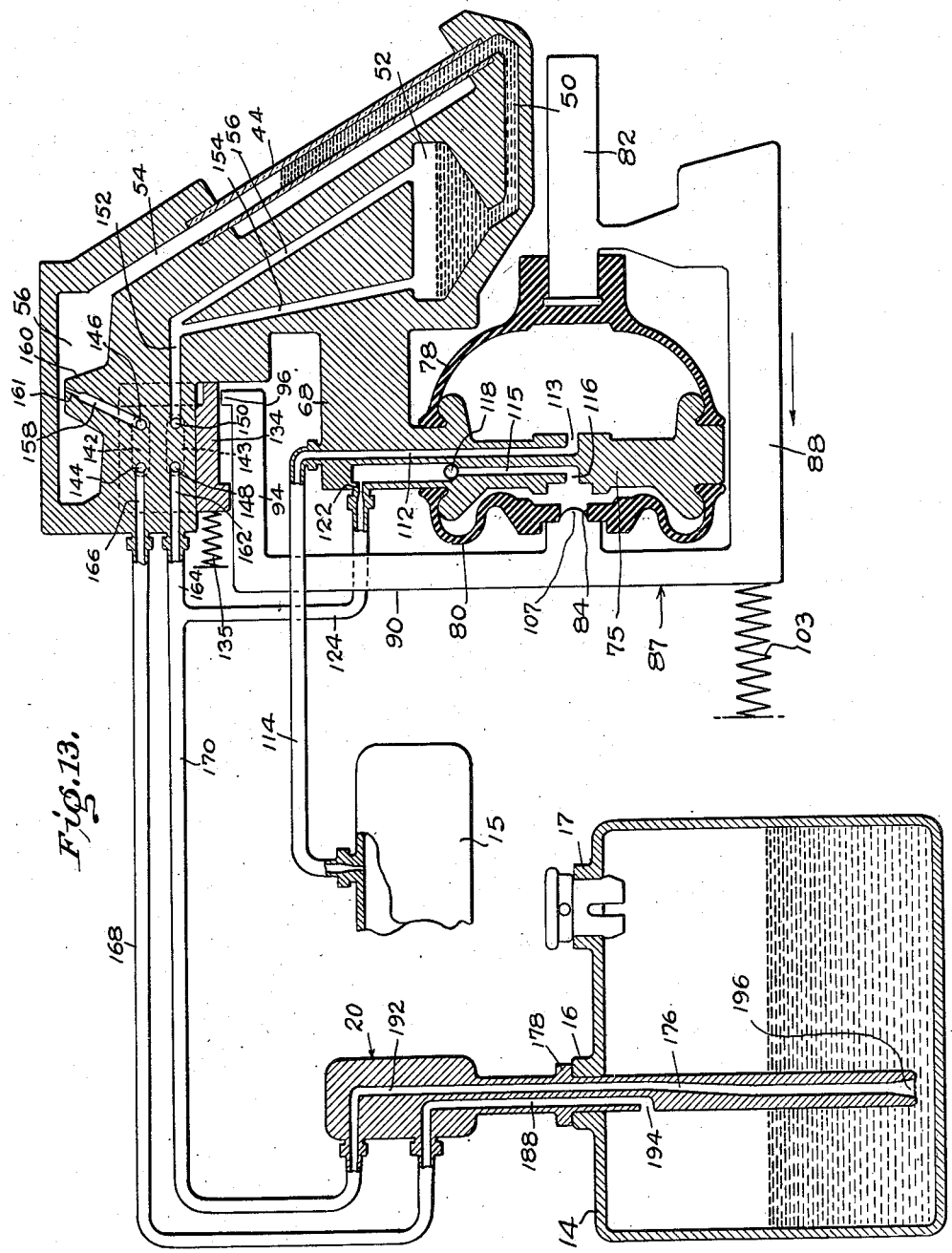
Figure 13 is a diagrammatic view illustrating the various fluid conduits forming a part of the invention.

Referring now more specifically to the accompanying drawings, wherein like numerals designate similar parts throughout the various views, attention is directed first to Figure 1, wherein it will be seen that there is indicated at 10 a portion of the front of an automotive vehicle having therein the customary fire wall 12 which divides the compartment containing the internal combustion engine 14 of the vehicle from the interior of the automobile. The engine 14 has the usual intake manifold 15 and is provided with the customary bosses 16 and 17 with openings therein for receiving, respectively, the conventional oil gage stick by means of which the fluid level of the lubricant in the crankcase may be manually gaged, and the usual oil filler cap with breather opening arrangement.

The improved gage forming the subject of this invention consists of a main gage body including a manometer, indicated generally by the numeral 18, and a replacement oil stick, indicated generally by the numeral 20, which is appropriately connected with the gage body in a manner which will subsequently become apparent. As shown clearly in Figure 1, the gage body 18 is detachably mounted to the fire wall 12, as by bolts and nuts or other suitable fasteners 22, while the replacement gage stick 20 is adapted to be removably seated in the gage aperture of the portion 16 in accordance with customary practice. Through suitable apertures in the fire wall 12, fluid connecting conduits extend which operatively connect the replacement gage stick 20 and the intake manifold 15 with the gage body 18 in a manner which will be set forth as the description proceeds.

When the attachment is properly applied and connected with the engine 14 of the automotive vehicle, an accurate reading will be visually evidenced upon the face of the gage body 18 upon stopping of the engine of the vehicle which will indicate, by the hydrostatic pressure of the liquid level in the crankcase, the relative quantity of lubricant therein.

Reference is now made primarily to Figures 2 and 4 for an understanding of the construction of the body portion of the improved gage.

The main body portion 18 of the liquid level gage, as shown particularly in Figures 2 and 4, consists of an upper portion 24 and a detachable front lower portion 26 secured thereto as by fastening means 28. As shown in Figures 2, 3, and 4, the upper body portion and the adjacent part of the front lower portion, 24 and 26, are provided with an inclined face 30 which constitutes the face of the gage, this face, in both the upper and lower portions, being provided with a chamber 32 closed by a transparent cover plate 34. A suitable scale sign 36 is mounted, painted or applied by decalcomania, on the inclined back of this chamber. As will be apparent from Figure 3, this scale sign may be graduated to show when the liquid level to be measured is at its greatest height, whereby the liquid contained being measured may be considered to be full, and successive graduations provide indications of different liquid levels corresponding to various conditions of the levels of the liquid in the crankcase which it is desired to measure.

On the inclined face 30 of the upper portion 24 of the main body is mounted, as at 38, a removable bracket or housing 40 having chambers therein for receiving and supporting a light bulb 42 and suitable fittings which are connected to the electric light circuit, not shown, whereby the gage face will be illuminated when the lights of the vehicle are turned on.

The chamber 32 in the body portions 24 and 26 is increased in depth at one side of inclined scale sign face 36 to form an enlarged quarter round space 43 extending the length of the chamber 32 at a forward corner of the body portions for receiving a transparent tube 44. The upper and lower end walls of the enlargement 43 of the chamber 32 have sockets 45 and 46 therein provided with bushings for the reception of the opposite ends of the transparent tube 44 which receives the fluid medium of the gage, and which visually indicates by a comparison of the level medium with the corresponding indication on the scale sign 36 the level of the liquid to be measured, as will be apparent from Figure 3. The cover plate 34 has its upper, lower, and one side edges arranged in grooves 47 formed in three sides of the chamber 32 and in addition to covering the scale sign 36 has a side portion thereof curved, as at 48, for extending around the corner of the body portions for also enclosing the transparent tube 44 and is secured in a recess and to the sides of the body portions by screws 49, as shown in Figures 2, 3, 5, and 8.

The body portion 26 further has a conduit 50 communicating with the socket 46 and with the lowermost portion of a cone-shaped bottom of a reservoir or chamber 52 formed in the upper surface of the lower body member 26, this reservoir containing the fluid medium comprising the gaging liquid of the gage and is provided with a series of baffles 53 extending upwardly from said cone-shape bottom, the purpose of which will be set forth as the description proceeds. The upper body portion 24 is likewise provided with a conduit or passage 54 communicating with the socket 45 and with the lowermost portion of an inclined bottom of a chamber 56 formed in the top surface of said upper body portion 24, said chamber 56 having a capacity in volume equal to or greater than the volume capacity of chamber 52 in lower gage body. This chamber 56 is closed by a suitable closure or cover plate 58, which is provided with a removable plug or cap 60 by means of which access may be obtained to the interior of the chamber 56 and with a depending baffle 61 which will also be later described.

Extending downwardly from the lower body portion 26 is a bracket 62 with a cap 64 detachably secured thereto as by fastening bolts 65. The bracket and cap are each recessed for retaining a semicircular fiber bushing 66 which together form a guide and journal bearing for a purpose to be later set forth.

Attached to and removably seated upon a vertical rear face of the upper body portion 24 is a diaphragm-supporting bracket 68, fastened by bolts as at 70. The bolts 70 further secure to the diaphragm-supporting bracket 68 the flanged extremity 71 of a mounting bracket 72 which has secured thereto the previously mentioned fastening means 22 for mounting the entire gage body upon the fire wall of an automotive vehicle.

Upon suitable laterally extending annular flanges 73 and 74 on opposite faces of a depending portion 75 of the diaphragm-supporting bracket 68 and engaging into annular grooves 76 and 77 at said flanges are positioned and detachably received the flanged, ribbed or beaded ends of a pair of flexible cup-shaped diaphragms 78 and 80, which are of any suitable material such as rubber or the like. The diaphragm 78 has rigidly yet detachably secured thereto, as shown by the clamp 81, a tubular guide and support rod 82 slidably received in the above-mentioned fiber bushing 66 in the guide bracket 62 and cap 64, while the diaphragm 80 at its central portion is provided with an aperture 84 for a purpose to be later set forth.

A diaphragm-operating member in the form of a sliding frame 87 is provided for controlling operation of the diaphragms with respect to each other, which consists of the guide rod 82, a depending arm 86 of tubular or hollow construction fixedly secured by welding or the like to an appropriate part of the rod 82, and to the forward end of a tubular sleeve 88 which, in turn, has attached to its rearward extremity by welding or the like, a perpendicular and vertically disposed tubular arm 90 which is loosely connected to the other diaphragm 80. The arm 90, besides being connected to diaphragm 80, extends upwardly through a slot 91 in the horizontal portion of the mounting bracket 72 and is slidably supported by fiber blocks 92 secured to the bracket 72, as at 93. Attached also by welding or the like to the upper end of the portion 90 and extending forwardly to overlie the sleeve 88 is another arm 94 provided with an enlarged head or closure cap 96 for a purpose which will later be set forth.

Positioned in the outer sleeve 88 is an inner sleeve 98 of fiber material which extends beyond the forward end of the outer sleeve 88 and a plate 99 welded to said outer sleeve and is received in an aligned opening 100 in the toe plate or block 101 secured to the plate 99 by bolts 102. A compression spring 103 is received within the inner sleeve 98 and abuts against the inner surface of the above mentioned toe plate 101, and against the extremity of an abutment pin 104 carried by the lower end of the mounting bracket 72 and which extends into the inner sleeve. The pin 104 thus constitutes a fixed guide upon which one end of the concentric sleeves 88 and 98 of the sliding frame 87 assembly is journaled, the other ends of the frame assembly being journaled by the rod 82 and guided by the blocks 92. The fiber bushing 66, fiber blocks 92, and fiber sleeve 98 are provided to eliminate metal-to-metal contact, and thus exclude objectionable noises.

As so far described, it will now be seen that the spring 103 pressing against the abutment pin 104 will urge the diaphragm-operating slide frame away from the abutment pin, thus expanding the diaphragm 78, and by means of a block 106 carried by the vertical arm 90, will collapse or compress the diaphragm 80, thus performing an operating stroke thereof.

The block 106 is provided with a semispherical projection 107 which is slightly larger than the diameter of the aperture 84 and which is adapted to enter the aperture 84 in the diaphragm 80 and, together with the aperture, form a valve for controlling opening and closing of the aperture. The loose connection between the arm 90 and the diaphragm 80, previously referred to, consists of pins 108 extending from opposite sides of the block 106 through slots 109 in ears 110 of the diaphragm 80, which permit opening and closing of the aperture 84. Thus, when the toe plate 101 is depressed or pushed toward the left from the position shown in Figure 2 to the position shown in Figure 4, the slide frame 87 will be moved in that direction against the resistance of the spring 103, thus withdrawing the block 106 and the projection 107 from contact with the diaphragm 80 and the aperture 84 thereof, thus permitting air to enter the diaphragm chamber and permit rapid expansion of the diaphragm. Upon release of the pressure applied to the toe plate 101, the spring 103 will cause the slide frame 87 to move forward or toward the right, the projection 107 now closing the aperture 84 and sealing the diaphragm chamber of the diaphragm 80 against leakage of air therefrom, whereupon the diaphragm slide frame will collapse the chamber and force the air therefrom through a passage system in a manner and for a purpose set forth hereinafter.

Normally, it will not be necessary to manually operate the slide frame in the above-mentioned direction by pressure on the toe plate 101, as the interior of the diaphragm 78 is in communication with the interior of the intake manifold 15 of the engine of the automotive vehicle, thus creating a vacuum in the diaphragm 78 sufficient to completely collapse same and move the slide frame to the left against tension of the spring 103 during operation of the engine. The manner in which such communication is made consists of an angled port 112 in the depending portion 75 of the diaphragm-supporting bracket 68, as shown in Figure 7, communicating at its lower end, as by a passage 113, with the interior of the chamber of the diaphragm 78, and at its upper end communicates with a suitable fitting and conduit 114 which, as indicated in Figures 1 and 13, is connected with the interior of the intake manifold 15.

Referring now more particularly to Figures 4, 7, and the diagrammatic view of Figure 13, it will be seen that the depending plate of the diaphragm-supporting bracket 68 is provided with a vertical, compressed air delivery passage 115 terminating as at 116 in a port provided with a strainer or filter element 117 and communicating with the interior of the diaphagm chamber of the diaphragm 80 for receiving and educting compressed air therefrom. This air discharge conduit is provided with a suitable non-return ball valve and seat indicated generally at 118, a lateral passage 120 communicating with the passage 115 above the valve seat, and from thence discharges the compressed air as through a venturi or metering orifice 122 of reduced cross-sectional area to a compressed air delivery conduit 124.

As will now be more clearly seen from Figure 4, the upper body 24 is provided with an overhanging portion having a smooth under surface 130 which is horizontally disposed and constitutes a slide surface for a valve, a vertical stop surface 132 being likewise formed upon the upper body portion. A valve block 134 is slidably received upon the surface 130 and is resiliently urged as by a spring means 135, see Figure 2, both upwardly against the valve surface 130 and also laterally against the stop surface 132, as shown in Figure 2. The valve member is provided with a laterally extending projection or nose 136 adapted to abut the surface 132, and thus stop the valve in valve-open position as set forth hereinafter. The valve is provided with an inclined surface 137 for a purpose which will later become apparent.

As shown in Figure 4, the valve member 134 is provided with a vertical, longitudinal slot 138 having a shoulder 139 therein, this slot slidably receiving the previously mentioned upper arm 94 of the diaphragm slide frame 87 whereby the headed portion 96 thereof may be engaged with the shoulder 139 and thus, in one direction of movement of the diaphragm slide frame after taking up a predetermined amount of lost motion, will urge the valve to its closing position against opposition of the spring 135.

In its upper surface, the valve member 134 is provided with a pair of parallel recesses 142, 143 which are adapted to selectively control two sets of ports disposed in pairs, as shown in Figure 5 at 144 and 146 and at 148 and 150. The port 150 communicates with a passage 152 formed in the upper body member 24, which passage at its end is forked to provide passages 154 and 156. The passages 154 and 156 as shown in Figure 13 communicate with the gage fluid reservoir 52.

The port 146 communicates with a passage 158 extending upwardly through a projection 160 in the chamber 56, and opening through a restricted opening 161 into the interior thereof. The port 148 communicates as by a passage 162, with a conduit 164, while the port 144 communicates by passage 166 with a conduit 168. As will now be seen by reference to Figure 13, the conduit 164 terminates in a forked portion to one of which the previously mentioned conduit 124 connects, while the other is connected to a conduit 170. The conduits 168 and 170 are in operative communication with the replaceable gage unit 20 in a manner and for a purpose to be now described.

As will be seen by Figures 9-11, the replacement gage stick 20 includes a weighted upper handle portion 172 having suitable connections for receiving the conduits 170 and 168, as shown in Figures 9 and 11. At its lower end, the handle 172 is provided with a bore 174 which receives the upper extremity of an outer sleeve 176, this sleeve being provided with a collar 178 adapted to form a stop to limit the downward insertion of the gage stick into the gage stick aperture, and for closing or sealing the upper end of this aperture, and for closing or sealing the upper end of this aperture, as by means of a felt washer or the like 180 disposed on the under surface of the collar 178. Along its length, the outer sleeve 176 may be provided with one or more struck out portions 182 constituting resilient fingers to assist in frictionally retaining the sleeve 176 in the gage stick aperture of the engine block. The sleeve 176 is open at its lower end and, as shown in Figure 10, is provided with the customary indicating marks or scales 184 by means of which the level of the oil may be fully and visually ascertained.

As will be seen from Figure 11, the bore at the lower end of the sleeve 176 is of lesser internal diameter than that of the upper portion of the same, in order to snugly receive therein an inner sleeve 186 which is spaced from the upper portion of the inner surface of the sleeve 176 to provide an annular passage or chamber 188. The upper end of the inner sleeve 186 extends through a diametrically reduced annular extension 190 of the bore 174, and is seated on the lower extremity of a passage 192 with which the conduit 170 communicates at its upper end. The conduit 168, in turn, communicates with the reduced bore 190, and from thence through the annular space 188 to form a concentric passage within the sleeve 186. This passage at any convenient place adjacent its lower end and above any possible liquid level communicates with the exterior of the replacement gage stick, as by suitable ports 194.

It will thus be seen that the conduit 170 communicates through the passage in the inner sleeve and from thence through the passage at the bottom of the outer sleeve with the lowermost portion of the crankcase below the surface of the liquid contained therein, while the conduit 168 communicates with the annular space between the two sleeves, and from thence, by means of the port 194, communicates with the interior of the crankcase above the liquid level therein. The location and size of the chamber 56 with respect to that of the gage fluid reservoir 52, detail construction of each, such as providing baffles 53 and 61, and the manner of communicating various ports and passageways with the reservoir and chamber, have been designed and arranged to eliminate any tendency of the gage fluid gaining access into the chamber 56 and thence to the outside through the port 146 or entering the passages 154 or 156 and out through the port 150 due to splashing, condensation, capillary attraction, or a sudden vacuum which may possibly occur during operation. If for any reason, the gage fluid should be displaced in the chamber, the level thereof will always be below that of the restricted opening 161 where it might possibly escape, because the chamber 56 is of greater volume than the reservoir 52; and by having the bottom of the chamber inclined to drain into the passage 54, all gage fluid in the chamber will return to the reservoir through the tube 44 when conditions return to normal.

From the foregoing, the construction of the device will now be readily understood and the operation thereof is as follows:

*Operation*

Assuming that the gage reservoir 52 has a sufficient quantity of gage fluid therein, that the gage stick 20 is properly positioned in the gage stick opening in the boss 16 of the crankcase, and it is desired to learn the quantity of oil in the crankcase of the engine, the mere stopping of the engine after it has been in operation a short period of time, or the depressing and releasing of the toe pad 101 will cause the gage fluid to assume a height in the tube 44 indicative of the level of oil in the crankcase.

Upon starting of the engine, the vacuum created in the intake manifold 15 collapses the diaphragm 78 which moves the slide frame 87 and other movable parts connected therewith from the position shown in Figures 2 and 13 to the position shown in Figure 4. The parts remain to the left or position shown in Figure 4 during the entire operation of the engine, and it is upon the stopping of the engine that a vacuum in the diaphragm 78 ceases to exist and the spring 103 returns the parts to the right or position shown in Figures 2 and 13. However, should the engine be stopped for a prolonged period of time before observing the height of the gage fluid, it may be necessary to reset the gage by manually depressing and releasing the toe pad 101 which will cause all parts to go through the same operation and assume the same positions they previously occupied while the engine was in operation and stopped.

The movement of the diaphragm-operating slide frame 87 to the left, against the resistance of spring 103 performs three functions.

First, it compresses the spring 103, storing power to return the slide frame to its normal or rest position shown in Figures 2 and 13 as soon as the actuating force is released.

Secondly, it expands or permits the expansion of the operating diaphragm 80. During this operation, the projection 107 is withdrawn from the diaphragm aperture 84 permitting air to rapidly enter the diaphragm, whereupon the latter either through its own resiliency or aided by movement of the slide frame will expand and become filled with air. The stroke of movement of the slide frame 87 is greater than the fully expanded movement of the diaphragm 80 which assures the withdrawal of the projection 107 from the aperture 84.

Thirdly, the enlarged head 96 on the arm 94 takes up the lost motion in the slot 138 of the slide valve 134, eventually engages the shoulder 139 moving this valve to the left against the action of valve spring 135. This movement of the valve causes the cut away portion 137 thereof to uncover passages 146 and 150, whereby the gage fluid reservoir 52 and the gage tube 44 are both vented to the atmosphere through passages 152, 154, 156, 54, 56, 161, and 158, thereby equalizing pressure upon both sides of the gage fluid so that said fluid may assume a common level in both reservoir and tube.

Upon release of the diaphragm slide frame, the energy of the compressed spring 103 moves the same to the rest position, performing thereby the following functions.

The initial return movement of the slide frame permits return movement of valve 134 by its spring to communicate its parallel passages 148, 143, 150 and 144, 142, 146. Upon completion of these communications, projection 107 of the frame securely seals orifice 84, thereby rendering the diaphragm 80 airtight and initiating a compression of the air trapped in the same, which continues through the remainder of the slide frame return movement.

As the diaphragm 80 begins to compress, the air trapped therein is forced through the filter or strainer 117, through passage 115, past check valve 118, through passage 120 into conduit 124. From conduit 124, the compressed air passes into both conduits 164 and 170, thereby driving all liquid downwardly from the tubes 176 and 186.

As soon as the slide frame has moved to seat the projection in the aperture, which occurs early in the return stroke, the passages 142 and 143 connect ports 144, 146 and 148 and 150. At this time, the compressed air from the diaphragm 80 continues to flow to the crankcase as previously described, and also flows through passages and ports 148, 143, 150, 152, 154, and 156 to the gage fluid reservoir 52. Air in the crankcase can now freely communicate with the chamber 56 by passing through the passages and bores 194, 188, and 190 of the gage stick 168 of the conduit, and 144, 142, 146, 158, and 161 of the sliding valve, where the air is then in communication with the upper surface of the gage fluid in the gage tube 44, through bore 54. The gage fluid in the gage tube and reservoir is thus subjected to a differential of pressure on the one side of the gage tube fluid column to that of the other.

Upon the action of the slide frame return stroke and hence of the expulsion of compressed air from diaphragm 80, this pressure differential is transmitted from the hydrostatic head of the height of the liquid level above the lower end of the gage stick tube 176. This pressure differential is transmitted through passages of tube 176, 170, 148, 143, 150, 152, 154, 156 to the surface of the gage fluid in reservoir 52, thereby raising the level of gage fluid in gage tube 48 by an amount proportioned to the hydrostatic head of the liquid level above the lower end of the gage stick tube 176.

By closing the air space above the column of gage fluid from the atmosphere and communicating this air with the interior of the crankcase, no outside pressures or vacuums caused by air currents will influence the level of the gage fluid and any variations, either a partial vacuum or a slight pressure existing in the crankcase, will be transmitted therefrom to the overhead air space above the column of gage fluid and thereby present the same overhead air condition in both the crankcase and the gage fluid tube.

Thus, the reading of the level of gage fluid on scale 36 will be proportional to the hydrostatic head in the end of the gage stick tube 176 and hence indicative of the level of liquid in the crankcase.

The amount of air trapped in the interior of the diaphragm 80 when the aperture 84 thereof is closed by the projection 107 is far in excess of that necessary to apply pressure on the liquid in the lower end of the sleeve 176 of the gage stick and gage fluid in the reservoir 52 to register in the tube 44 the quantity of oil in the crankcase; therefore, the surplus compressed air is forced from the end of the sleeve 176 and bubbles to the surface of the crankcase oil, which will cause a slight fluctuation of the height of gage fluid in the tube 44 until all surplus compressed air has been expelled from the diaphragm. To diminish to the smallest degree the amount and rapidity of fluctuations of gage fluid in the tube 44, the restricted orifice 122 and the flared opening 196 on the end of the sleeve 176 are provided. The orifice slows down the flow of air, while the flared end opening 194 increases the size of each air bubble forced through the crankcase oil. After all surplus air has been expelled, the fluctuations of height of gage fluid in the tube 44 ceases and a constant level is held for a considerable length of time, determined by whatever leaks there may be in the air pressure on the two bodies of liquids.

If any air leaks occur in any of the passages, the system may be primed as aforesaid, expelling liquid from the air passages.

Obviously, the device may be employed for indicating the liquid level of any type of liquid container.

In view of the foregoing description taken in conjunction with the accompanying drawings, it is believed that a clear understanding of the construction, operation, and advantages of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. In an internal combustion engine having an oil-containing crankcase with an opening therein and a manifold capable of creating a vacuum, a manometer, a tube extending through said opening in said crankcase and into the oil therein, a pair of diaphragm closed chambers, a slide connected to the diaphragms of both chambers for expanding one diaphragm closed chamber during the collapsing of the other, fluid passage means connecting the interior of one diaphragm closed chamber with the interior of said manifold for moving the slide in one direction, other fluid passage means communicating the interior of the other diaphragm closed chamber with said tube and said manometer, a valve arranged at the connection of said slide to the diaphragm of said last-mentioned diaphragm closed chamber to be opened to the atmosphere when said last-mentioned diaphragm closed chamber is expanded and closed during the collapsing thereof, and spring means for moving said slide in the opposite direction to collapse said last-mentioned diaphragm closed chamber and force the air contained therein to said tube and manometer upon the ceasing of a vacuum in the manifold.

2. A device for indicating the level of liquid in a container comprising a gage tube having a liquid level scale sign associated therewith, a liquid reservoir in communication with the lower end of said gage tube and partially filled with an indicating liquid, a chamber above said tube and communicating with the upper end thereof, said chamber having a capacity at least as great as that of the reservoir, a fluid conduit connecting said reservoir with said liquid container above the liquid level in the reservoir and immersed below the level of liquid in the container, another fluid conduit connecting said chamber with the liquid container above the level of liquid in the container, and means connected to said first-mentioned fluid conduit for producing therein gaseous pressure for expelling liquid from said immersed end of said conduit whereby the level of indicating liquid in said gage tube is raised proportionally to the liquid level in said container.

3. A device for indicating the level of liquid in a container comprising a gage tube having a liquid level scale sign associated therewith, a liquid reservoir in communication with the lower end of said gage tube and partially filled with an indicating liquid, a chamber above said tube and communicating with the upper end thereof, a fluid conduit connecting said reservoir with said liquid container above the liquid level in the reservoir and immersed below the level of liquid in the container, another fluid conduit connecting said chamber with said liquid container above the level of liquid in the container, an air compressor connected to said first-mentioned fluid conduit for producing and applying a quantity of gaseous pressure for expelling liquid from said immersed end of said conduit, a valve having a pair of valve passages, each passage controlling one of said fluid conduits for venting the ends of said conduits to said reservoir and chamber to the atmosphere, and an actuator connected to said valve and compressor for opening and closing said conduits to the atmosphere prior to application of gaseous pressure for expelling liquid from the immersed end of said first-mentioned conduit.

4. A device for indicating the level of liquid in a container comprising a gage tube having a liquid level scale sign associated therewith, a liquid reservoir in communication with the lower end of said gage tube and partially filled with an indicating liquid, a chamber above said tube and communicating with the upper end thereof, a fluid conduit connecting said reservoir with said liquid container above the liquid level in the reservoir and immersed below the level of liquid in the container, another fluid conduit connecting said chamber with said liquid container above the level of liquid in the container, an air compressor connected to said first-mentioned fluid conduit for producing and applying a quantity of gaseous pressure for expelling liquid from said immersed end of said conduit, a valve having a pair of valve passages, each passage controlling one of said fluid conduits for venting the ends of said conduits to said reservoir and chamber to the atmosphere, and a slide mounted for reciprocal motion and connected to said valve and compressor for opening said conduits to the atmosphere upon movement thereof in one direction and for closing said conduits upon the first portion of its return motion in the opposite direction and prior to operation of said compressor upon further return motion thereof.

ELVIN E. HOSKINS.

References Cited in the file of this patent

UNITED STATES PATENTS

| Number | Name | Date |
|---|---|---|
| 548,718 | Mitchell | Oct. 29, 1895 |
| 1,241,384 | Hueber | Sept. 25, 1917 |
| 1,413,235 | Novick et al. | Apr. 18, 1922 |
| 1,420,628 | Fox | June 27, 1922 |
| 1,657,330 | Winslow | Jan. 24, 1928 |
| 1,698,701 | Smithe | Jan. 8, 1929 |
| 1,924,495 | Gustine | Aug. 29, 1933 |
| 2,028,553 | Lubin | Jan. 21, 1936 |
| 2,427,690 | Peterson | Sept. 23, 1947 |

FOREIGN PATENTS

| Number | Country | Date |
|---|---|---|
| 632,401 | France | Jan. 9, 1928 |
| 47,108 | France | Jan. 18, 1937 |

(1st addition to No. 785,394)